United States Patent [19]
Mix et al.

[11] Patent Number: 5,598,042
[45] Date of Patent: Jan. 28, 1997

[54] MOVEABLE DESKTOP LOAD CONTROLLER

[75] Inventors: Jerome M. Mix, Redwood City; Charles C. Hu, Saratoga; James M. Young, Boulder Creek, both of Calif.

[73] Assignee: The Watt Stopper, Santa Clara, Calif.

[21] Appl. No.: 481,604

[22] Filed: Jun. 7, 1995

Related U.S. Application Data

[63] Continuation-in-part of Ser. No. 125,989, Sep. 22, 1993, Pat. No. 5,455,487.

[51] Int. Cl.⁶ .................................................. H01H 35/00
[52] U.S. Cl. ..................... 307/116; 307/112; 315/133; 315/154; 340/527; 340/541; 340/554; 340/565; 340/566; 340/573; 364/138; 367/94
[58] Field of Search ..................... 307/112, 116; 315/133, 154, 150; 340/527, 541, 554, 565, 573; 364/138; 367/94

[56] References Cited

U.S. PATENT DOCUMENTS

| | | | |
|---|---|---|---|
| 3,459,961 | 8/1969 | Ravas | 307/116 |
| 3,500,455 | 3/1970 | Ross et al. | 315/149 |
| 3,573,543 | 4/1971 | Grindstaff | 315/194 |
| 3,864,566 | 2/1975 | Simpson et al. | 250/216 |
| 3,898,383 | 8/1975 | Herbits | 179/1 VC |
| 4,021,679 | 5/1977 | Bolle et al. | 307/117 |
| 4,450,351 | 5/1984 | Fraden | 250/221 |
| 4,461,977 | 7/1984 | Pierpoint et al. | 315/159 |
| 4,474,185 | 10/1984 | Diamond | 128/721 |
| 4,540,984 | 9/1985 | Waldman | 340/825 |
| 4,568,868 | 2/1986 | Schlepp et al. | 320/5 |
| 4,636,774 | 1/1987 | Galvin et al. | 340/565 |
| 4,650,986 | 3/1987 | Maile | 250/214 SW |
| 4,697,122 | 9/1987 | Hoffer | 315/158 |
| 4,727,593 | 2/1988 | Goldstein | 455/605 |
| 4,758,767 | 7/1988 | Blake | 315/158 |
| 4,818,973 | 4/1989 | Yamakara et al. | 340/572 |
| 5,043,531 | 8/1991 | Guteson et al. | 174/49 |
| 5,099,193 | 3/1992 | Mosley et al. | 323/324 |
| 5,189,393 | 2/1993 | Hu | 340/522 |
| 5,220,250 | 6/1993 | Szuba | 315/307 |
| 5,289,365 | 2/1994 | Caldwell et al. | 364/138 |
| 5,293,097 | 3/1994 | Elwell | 315/154 |
| 5,386,210 | 1/1995 | Lee | 340/567 |
| 5,406,173 | 4/1995 | Mix et al. | 315/156 |
| 5,438,318 | 8/1995 | Latorre et al. | 340/554 |
| 5,465,198 | 11/1995 | Kellogg | 362/253 |
| 5,476,221 | 12/1995 | Seymour | 236/47 |
| 5,489,891 | 2/1996 | Diong et al. | 340/567 |

FOREIGN PATENT DOCUMENTS 2183377  6/1987  United Kingdom.

OTHER PUBLICATIONS

"Lite–Miser" Brochure.
Phillips Lighting, pp. 1–6, (Sep. 1990).

*Primary Examiner*—William M. Shoop, Jr.
*Assistant Examiner*—Albert W. Paladini
*Attorney, Agent, or Firm*—Townsend and Townsend and Crew LLP

[57] ABSTRACT

A device for controlling power to an electrical load. The device has two components: a portable desktop detector unit and an electrical powerstrip. The desktop detector detects the presence of a human in a room and sends signals to the powerstrip to supply power to or withhold power from individual electrical loads connected to the strip. Since the detector is portable, it can be positioned and repositioned at different locations in a room to maximize its ability to detect the presence of a person. The system can also communicate by wireless signals to a wall-mounted control unit to control light fixtures in the room. When used with a wall-mounted control unit, a photo sensor that detects the level of ambient light in a room allows the system to adjust the brightness of lights in the room depending upon the available ambient light level. Each detector and receiver pair have matching addresses so that a receiver will operate an electrical load only in response to its mated detector, thus allowing multiple devices to be used to control multiple lights without interfering with each other. The device can also operate with a third component that acts as a master key and controls the maximum brightness, at which lights may be operated.

13 Claims, 13 Drawing Sheets

MOVEABLE DESKTOP LOAD CONTROLLER

This application is a continuation-in-part of U.S. Ser. No. 08/125,989, filed Sep. 22, 1993, which is now U.S. Pat. No. 5,455,487, issued Oct. 3, 1995.

BACKGROUND OF THE INVENTION

The present invention relates to a device that controls power to an electric load. More specifically, the present invention relates to sensors for detecting the presence of a person in an area and activating and controlling lights or other apparatus accordingly.

There are a variety of sensors on the market that detect the presence of a person in a room for the purpose of automatically turning lights ON and OFF. Most often these sensors detect a person's presence by detecting either movements of the person or his or her body heat. Movement is commonly detected by using an ultrasonic transmitter and receiver that are mounted at a position in a room that is most likely to detect movement. The ultrasonic transmitter transmits an ultrasonic signal that reflects off objects in the room and is detected by the ultrasonic receiver. An examination of the frequency of the received waves can be used to detect movement by the Doppler effect. Because of the ability of ultrasonic waves to bounce off objects, ultrasonic motion detectors can suffer from the disadvantage that movement which occurs outside of a room or desired area can be detected by the sensors. Thus, ultrasonic motion detectors have a tendency to switch lights ON when the lights are not actually needed.

Another method of detecting the presence of people is by using an infrared sensor that detects the heat given off by a person in the room. Such infrared sensors detect a rapid change in heat, such as when a person enters a room, and are mounted at a position in the room in which they are likely to detect a person. Because infrared sensors only detect rapid changes in heat, they often correctly distinguish between slow and constant heat increases brought on by a device such as a heating element, computer, or coffee maker in the vicinity of the sensor. However, when heat sources that rapidly change temperature such as tungsten lamps are present, infrared sensors often falsely indicate the presence of a person. Additionally, infrared sensors may not be able to detect a person who is not in the immediate vicinity of the sensor or is blocked by a chair, bookcase, or other object.

The level of sensitivity of infrared sensors is typically adjustable. However, adjusting a sensor so that it is more likely to detect a person at a distance means the sensor will also be more likely to falsely indicate the presence of a person if some other heat source is present. Accordingly, since prior art sensors only allow for the sensitivity of the sensor to be adjusted, false readings are likely to occur in certain situations.

The above problems of correctly determining the presence of a person are greatly exacerbated if a workroom is large and commonly has only one person working at one of two or more different locations in the room.

There are also sensors on the market that adjust the brightness of lights in a room or turn the lights ON and OFF depending on the level of ambient light detected by the sensor. These sensors are subject to the same difficulties and inefficiencies as the prior art sensors detecting the presence of a person in that they too are mounted in a single position, usually near the lighting source. However, if a person frequently works far from the location of the sensor, lights that are needed in order to perform work tasks may be switched OFF or dimmed by the sensor. Some ambient light sensors are adjustable to turn lights ON and OFF at different levels, but the adjustment mechanism is on the sensor or at a power switching location requiring a person to move each time an adjustment in the sensor's sensitivity is to be made.

SUMMARY OF THE INVENTION

The present invention solves the problems associated with prior art sensors that control power to an electric load by providing a sensor device that consists of two separate components: a portable desktop detector unit and a wall mounted load control unit. In one embodiment, the desktop detector detects the presence of a human in a room and the ambient light level and sends wireless signals to a receiver in the load control unit to supply power to or withhold power from an electrical load such as a fluorescent light, and to adjust the brightness of the light. Since the detector is portable, it can be positioned and repositioned at different locations in a room to maximize its ability to detect the presence of a person and to sense the level of ambient light in various room locations. The sensor's mobility also makes it ideal for detecting the level of ambient light at the location where a person is present or is working in a room. The wall mounted load control unit receives signals transmitted by the desktop detector unit and controls an electric load accordingly.

Identification addresses can be assigned to both the detector unit and the load control unit so that each detector and load control unit pair have matching addresses, ensuring that a load control unit will operate an electric load only in response to signals transmitted by its mated detector. The identification addresses allow multiple devices to control multiple lights without interfering with each other. The device can also operate in conjunction with a third component, a maintenance unit, that acts as a master key and controls the maximum brightness a user can select for the lights.

In one embodiment of the present invention, a sensor detects whether a room is occupied and generates an indicative control signal. The control signal is then wirelessly transmitted to a switch that switches power to an electric load ON and OFF in response to the control signal.

Another embodiment of the invention provides for a moveable sensing device and a wall- or ceiling-mounted load control unit. The moveable sensing device includes a sensor that detects whether a person is in a room, a timing circuit that detects whether a person leaves the room, a signal generator that generates a control signal to switch an electric load ON and OFF, and a transmitter that transmits the control signal by a wireless transmission method. The mounted control unit includes a signal receiver to receive the wireless transmission of the control signal, and a switch that responds to the control signal to switch power to an electric load ON and OFF.

Another aspect of the invention provides a photo sensor for detecting the ambient light level in a room, a circuit that calculates the output intensity level of a light in response to the level of detected ambient light, and a circuit that adjusts the brightness of a light to the calculated intensity level. The photo sensor may be part of the portable desktop detector, or alternatively, may be affixed to another location in the area such as the load control unit. Using an input device on the portable desktop detector, one may select a brightness level to which the circuits will adjust the light.

The features and advantages of an electric load controller according to the present invention will be more clearly understood from the following description taken in conjunction with the accompanying drawings.

DETAILED DESCRIPTION OF THE PREFERRED EMBODIMENTS

I. Occupancy Detector

Figure 1:
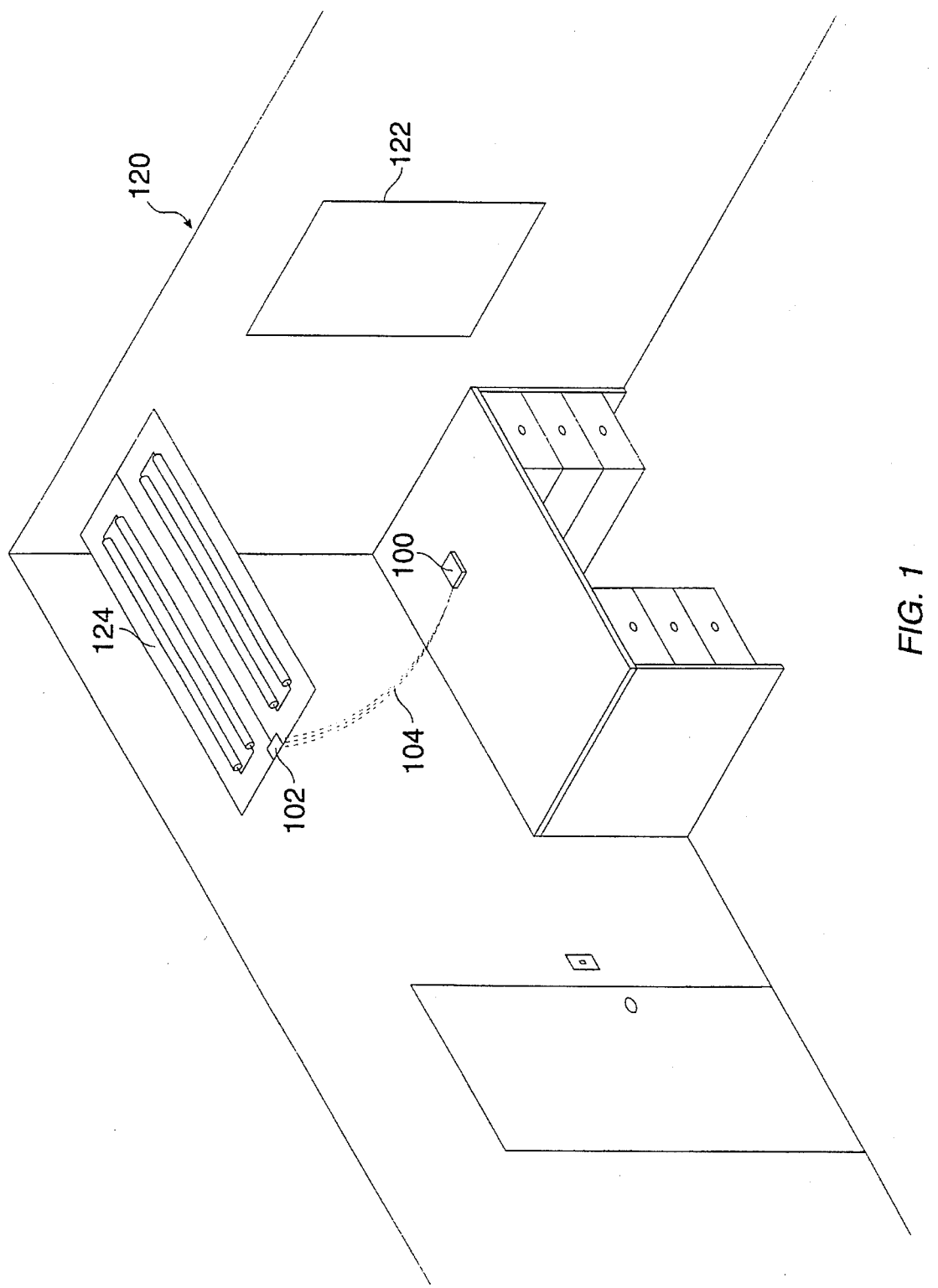
FIG. 1 is a perspective view of the desktop sensor system installed in a room according to one embodiment of the present invention.

FIG. 1 is a perspective view of the desktop sensor system installed in a room according to one embodiment of the present invention. The sensor shown in FIG. 1 includes a portable sensing device 100 and a load control unit 102. Sensing device 100 operates on battery power to detect the presence of a person in a room 120. Sensing device 100 processes the received information and communicates the processed information in the form of control signals 104 to load control unit 102 by a wireless transmission method.

Load control unit 102 receives control signals 104 transmitted by sensing device 100 and switches a light 124 ON or OFF. Typically load control unit 102 is mounted on a wall or ceiling near light 124. Because the sensing device 100 operates on battery power and communicates to load control unit 102 by wireless transmission, it has no wires or electric cords attached to it. Thus, sensing device 100 is completely portable and can be easily moved to any suitable location in a room. Alternately, sensing device 100 could plug into AC power instead of using a battery, but still communicate to load control unit 102 by a wireless method.

Figure 2:
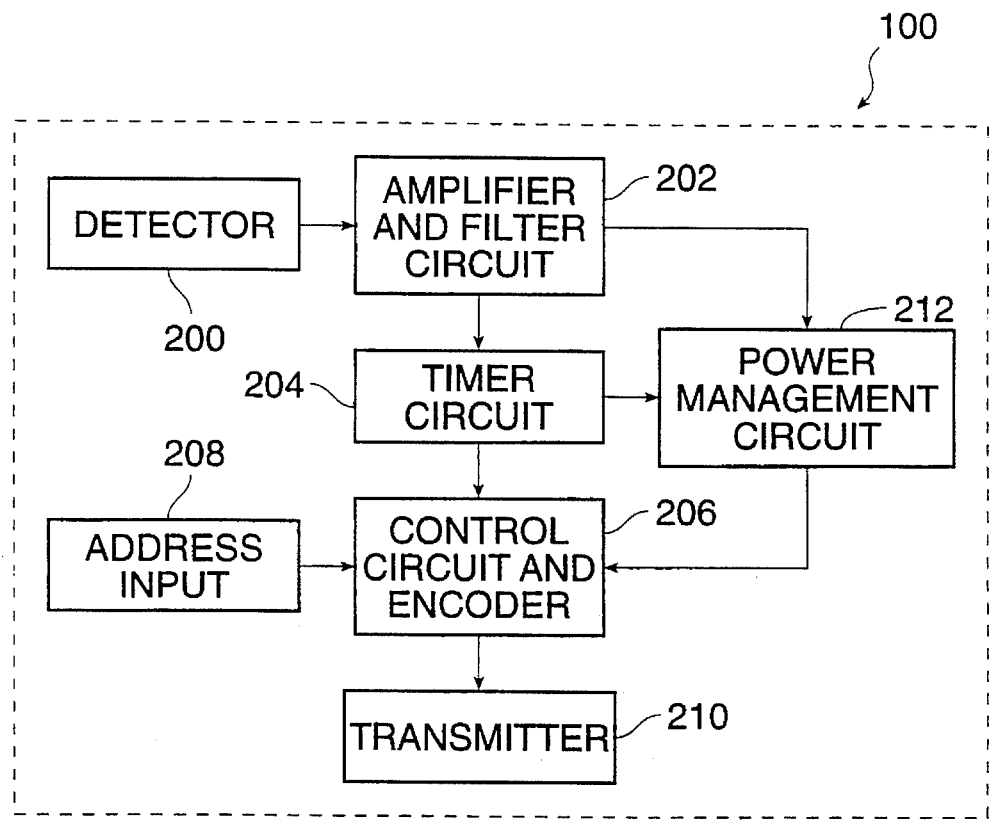
FIG. 2 is a block diagram of one embodiment of the portable sensing device of the sensor system shown in FIG. 1.

FIG. 2 is a block diagram of one embodiment of portable sensing device 100 shown in FIG. 1. The portable sensing device of FIG. 2 comprises a detector 200, an amplifier and filter circuit 202, a timer circuit 204, a control circuit and encoder 206, an address input unit 208, a transmitter 210, and a power management circuit 212.

Detector 200 can use any of a variety of means to detect the presence of a person in a room. For example, detector 200 can include an infrared detector that senses the body heat of anyone present in a room or an ultrasonic motion detector that detects movement in a room. Persons skilled in the art of sensors will recognize a variety of other means to implement detector 200. An infrared detector is preferred in one embodiment because it is a passive means of detecting a person, and thus requires less battery power than an ultrasonic motion detector, which must actively transmit ultrasonic waves to detect movement.

A detection signal is generated by detector 200, which is coupled at an output to an input of amplifier and filter circuit 202, when the presence of a person is detected. Amplifier and filter circuit 202 amplifies and filters the detection signal received from detector 200 to separate noise signals and more accurately allow sensing device 100 to detect a person.

Amplifier and filter circuit 202 is coupled to transmitter 210 through timer circuit 204 and control circuit and encoder 206. When a person is detected by detector 200, transmitter 210 transmits an asserted control signal directly, or uses it to modulate a carrier signal, to indicate to load control unit 102 that light 124 should be switched on.

Timing circuit 204 times the periods in which detector 200 does not detect the presence of a person. If light 124 is switched ON and a predetermined period of time expires without detector 200 detecting a person, timing circuit 204 communicates to transmitter 210 through encoder 206 that light 124 should be switched off (sleep mode). Transmitter 210 then transmits a deasserted control signal, indicating the absence of a person, to control unit 102. In other embodiments of the present invention, timing circuit 204 can perform more complicated timing functions, as well known in the art, see for instance, U.S. Pat. No. 4,571,399 assigned to Novitas, Inc. Additionally, one of skill in the art will recognize that all sorts of algorithms may be employed to predict when a person will be absent from an area for a substantial period of time.

Transmitter 210 can be either a radio frequency transmitter or an infrared transmitter. An infrared transmitter is preferred in one embodiment because infrared signals are less likely to travel outside of a room and interfere with the operation of other desktop sensors.

The circuitry associated with detecting the presence and absence of a person in an area is well known to those skilled in the art. One example that details how to implement both an ultrasonic detector and an infrared detector is U.S. Pat. No. 5,189,393 entitled "Dual Technology Motion Sensor" assigned to Applicants and incorporated by reference into this application for patent. In fact, it is possible for detector 200 to be a dual technology detector as described exactly in U.S. Pat. No. 5,189,393.

Address input unit 208 is a bank of DIP switches that allows a user to select an address for sensing device 100. Alternatively, the address can be preprogrammed or programmable by a maintenance unit, with address unit 208 being the internal memory holding the address. Each sensing device transmits an address signal with the control signal to allow multiple desktop sensors to be used in a single environment. Each sensor (mated sensing device and load control unit pair) can be programmed to respond to control signals with a specific address preventing the load control unit in one room from responding to stray signals from a portable sensing device located in another room or hallway. The address signal in one embodiment is 8-bits allowing one of 256 addresses to be chosen. Of course, any number of bits can be used to store the address of each sensing device and load control unit.

Address input unit 208 is coupled to control circuit and encoder 206. The address selected through address input unit 208 is encoded by control circuit and encoder 206 and transmitted along with the control signal by transmitter 210. Other means of allowing address selection are possible such as a single multi-position switch or a keypad input. In one embodiment, control circuit and encoder 206 is implemented by the HT600 Encoder chip manufactured by Holtek Microelectronics, Inc.

Power management circuit 212 is coupled to detector 200 through amplifier and filter circuit 202, timer circuit 204, and control circuit and encoder 206. Power management circuit 212 places timer circuit 204 and control circuit and encoder 206 of portable sensing device 100 in sleep mode to minimize current dissipation and conserve battery power. In operation, detector 200 is always active.

When timer circuit 204 detects that detector 200 has not detected the presence of a person for period of time (typically between 3–15 minutes), timer circuit 204 times-out and power management circuit 212 places portable sensing device 100 in sleep mode. Portable sensing device 100 remains in sleep mode until detector 200 detects the presence of a person. When a person is detected, timer circuit 204 and control circuit and encoder 206 are released from sleep mode.

In one embodiment of the present invention, power management circuit 212, control logic and encoder 206, and timer circuit 204 are all implemented through a microprocessor or microcontroller chip.

Figure 3:
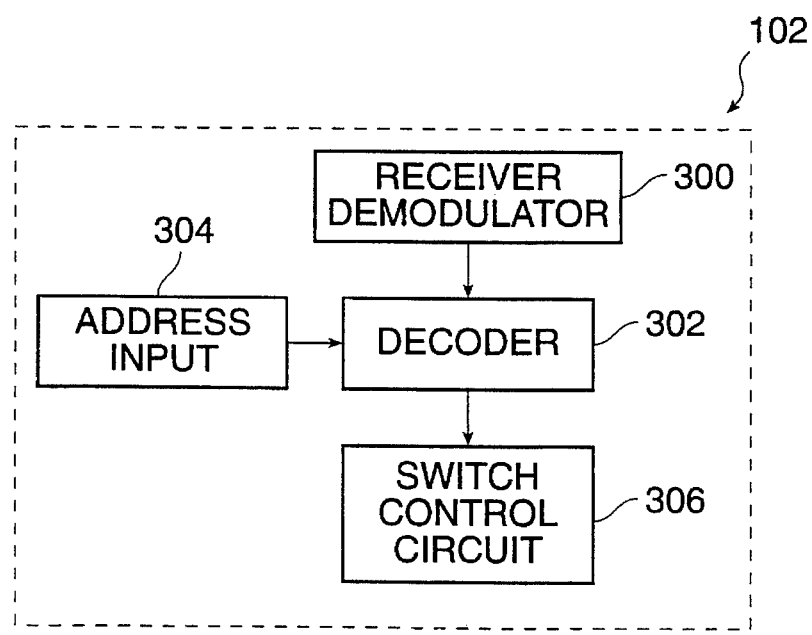
FIG. 3 is a block diagram of one embodiment of the load control unit of the sensor system shown in FIG. 1.

FIG. 3 is a block diagram of one embodiment of load control unit 102 shown in FIG. 1. Load control unit 102 of FIG. 3 comprises a receiver and demodulator 300, a decoder 302, an address input unit 304, and a switch control circuit 306.

Receiver and demodulator 300 receives and demodulates the address and control signals transmitted by transmitter 210 of sensing device 100. Receiver and demodulator 300 is of an appropriate type to communicate with transmitter 210. Thus, if transmitter 210 is a radio frequency transmitter, receiver and demodulator 300 is a radio frequency receiver. Whereas if transmitter 210 is an infrared signal transmitter, receiver and demodulator 300 is an infrared signal receiver and thus includes a photodetector.

Figure 4:
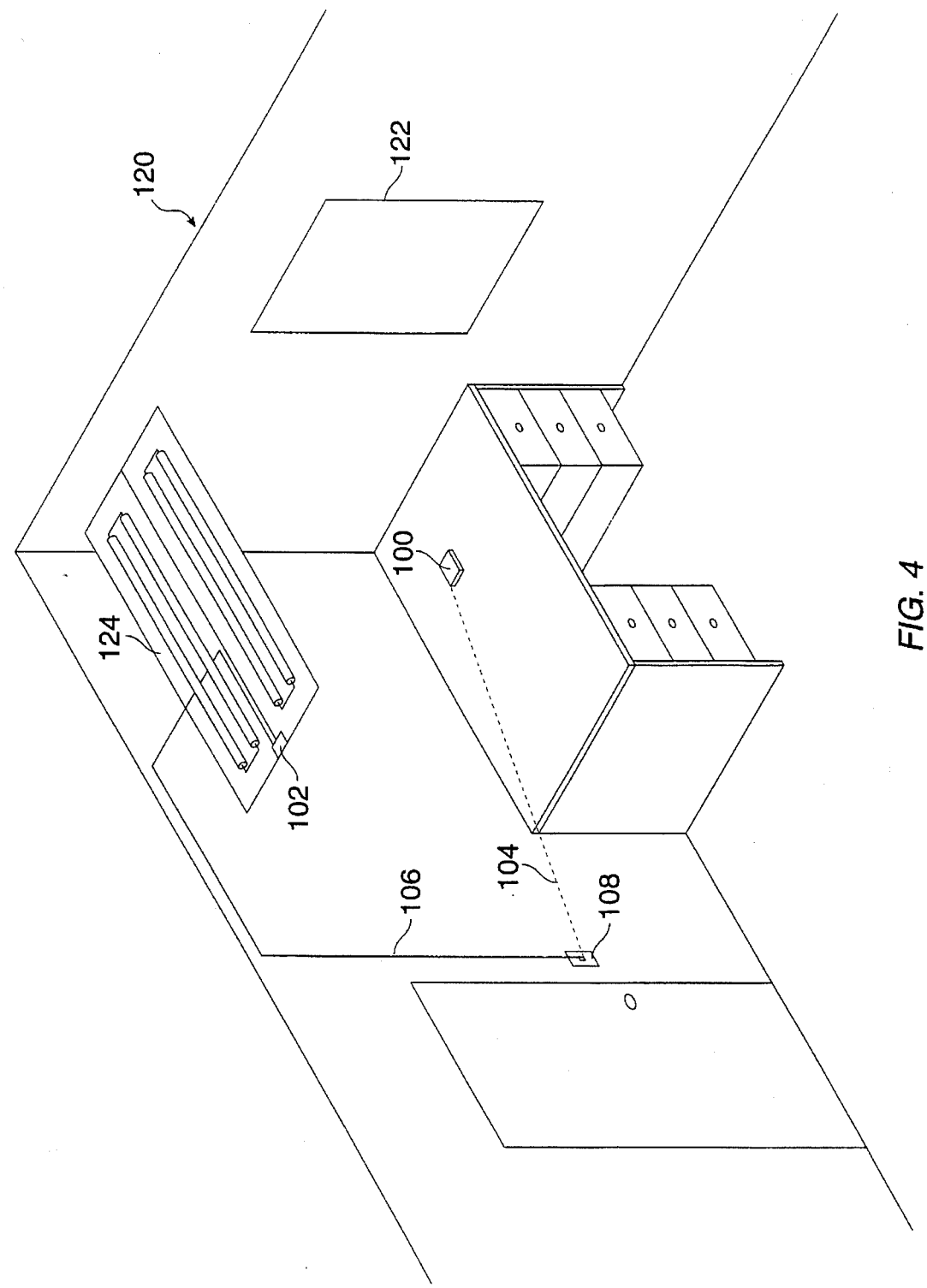
FIG. 4 is a perspective view of a desktop sensor that uses a fiber optic cable to carry signals transmitted from the portable sensing device of FIG. 2 to the load control unit of FIG. 3.

As shown in FIG. 4, when transmitter 210 is an infrared signal transmitter, it is possible to use a fiber optic cable 106 to carry the infrared signal transmitted from transmitter 210 of remote sensing unit 100 to receiver and demodulator 300 of load control unit 102. Fiber optic cable 106 is exposed at a point 108 in a suitable position to receive light signals transmitted by transmitter 210 such that the received light signals enter fiber optic cable 106 at an angle suitable for the signals to be transmitted through fiber optic cable 106. Using fiber optic cable 106 to transmit the infrared signal from transmitter 210 to receiver and demodulator 300 allows load control unit 102 to be situated so that it is completely hidden from visual sight, such as above a ceiling near light 124.

Receiver and demodulator 300 is coupled to decoder 302, which decodes the received address and control signals. Decoder 302 is coupled to address input unit 304, which allows a user to assign an address to receiver/load control unit 102. For proper operation, the address assigned to control unit 102 matches the address selected for remote sensing device 100, thus making the two components a mated pair. Address input unit 304 is a memory or a bank of DIP switches similar to address input unit 208. If the addresses match, switch control circuit 306 operates light 124 by switching it ON if the received control signal is asserted or switching it OFF if the received control signal is deasserted.

Figure 5:
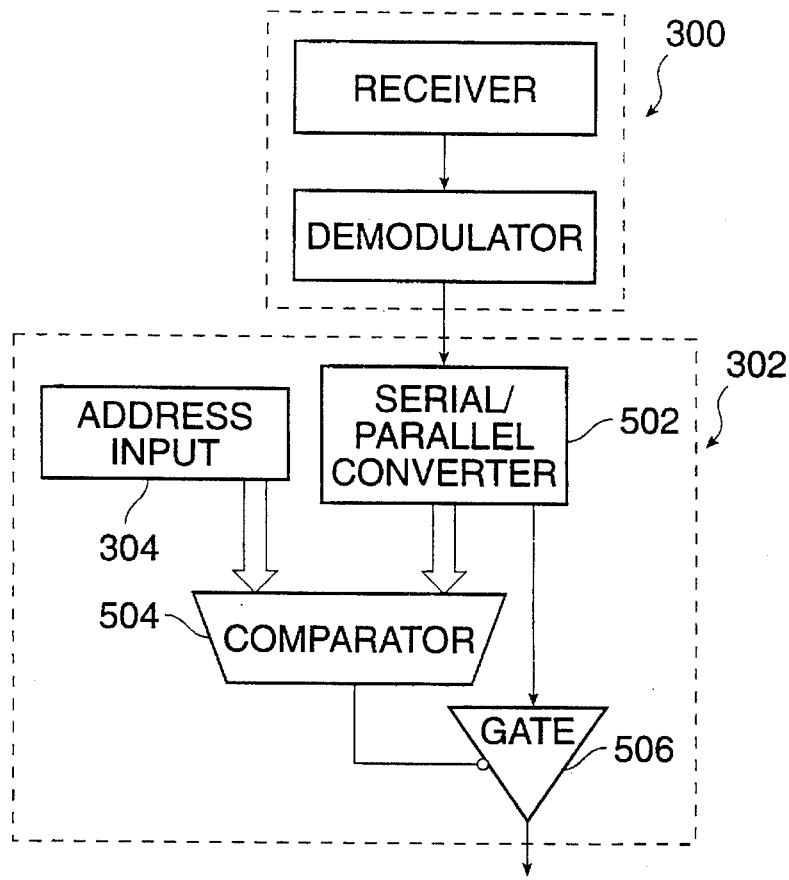
FIG. 5 is a block diagram of an embodiment of the decoder shown in FIG. 3.

FIG. 5 is a block diagram of one embodiment of decoder 302 shown in FIG. 3. Decoder 302 comprises a serial-to-parallel converter 502, a comparator 504, and a gate 506. Serial-to-parallel converter 502 receives the demodulated signal from receiver and demodulator 300 in serial format and converts it to a parallel digital signal. The parallel signal comprises an 8-bit address portion and a 1-bit control portion. Comparator 504 compares the address signal from address input unit 304 with the address signal from serial-to-parallel converter 502 and outputs a signal that controls gate 506. Gate 506 allows the control signal from serial to parallel converter 502 to go to switch control circuit 306 if the addresses input to comparator 504 match. Otherwise, gate 506 is closed and cannot send the control signal through to switch control circuit 306. In one embodiment, decoder 302 is implemented by the HT605 Decoder chip manufactured by Holtek Microelectronics, Inc.

II. Occupancy Detector with Ambient Light Control

Figure 8:
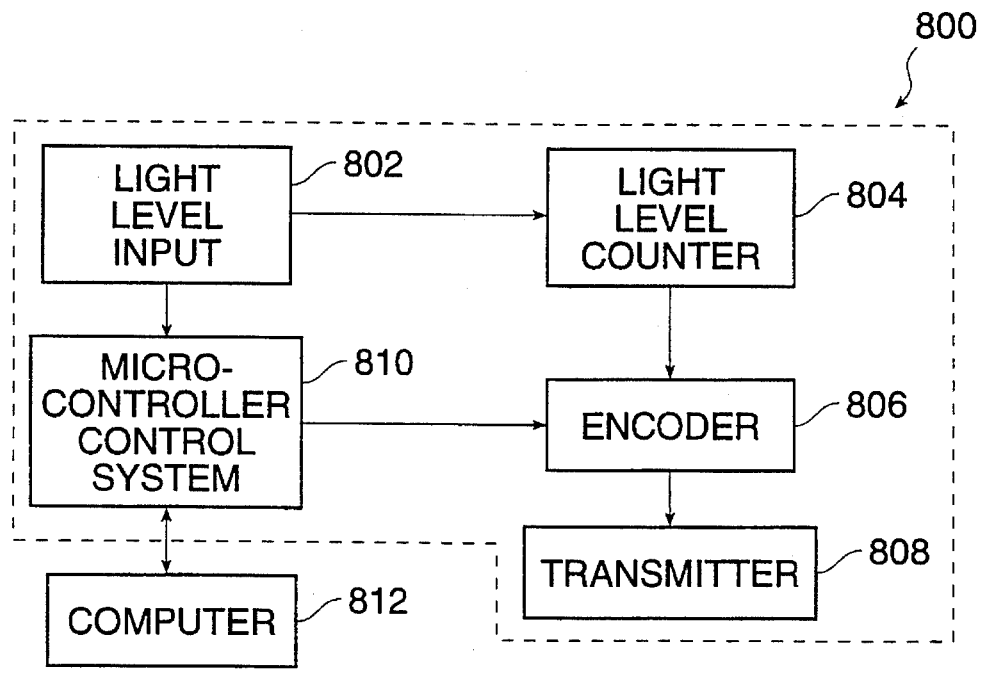
FIG. 8 is a block diagram of one embodiment of the maintenance unit for use with the sensor system illustrated in FIGS. 6–7.
Figure 6:
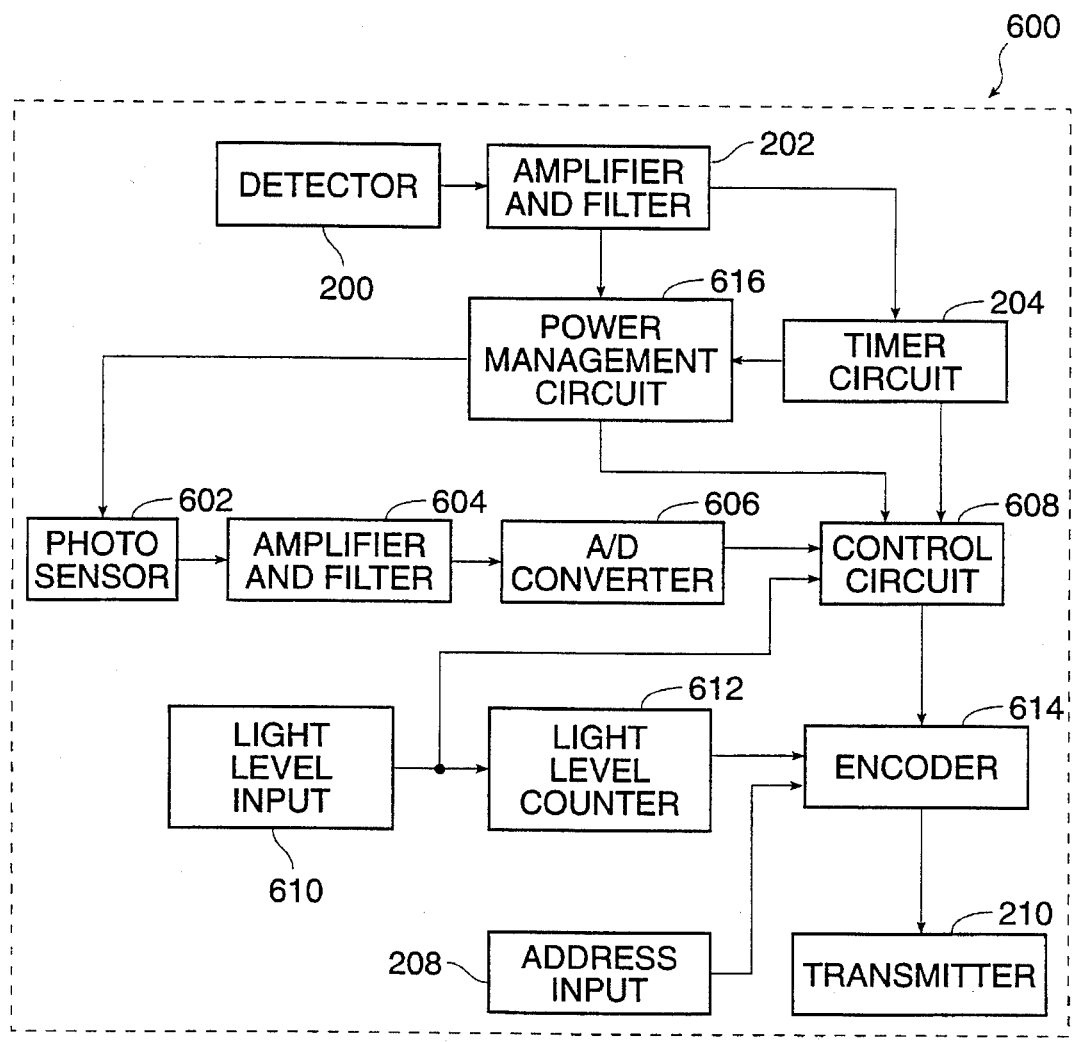
FIG. 6 is a block diagram of a second embodiment of the portable sensing device of the sensor system shown in FIG. 1.
Figure 7:
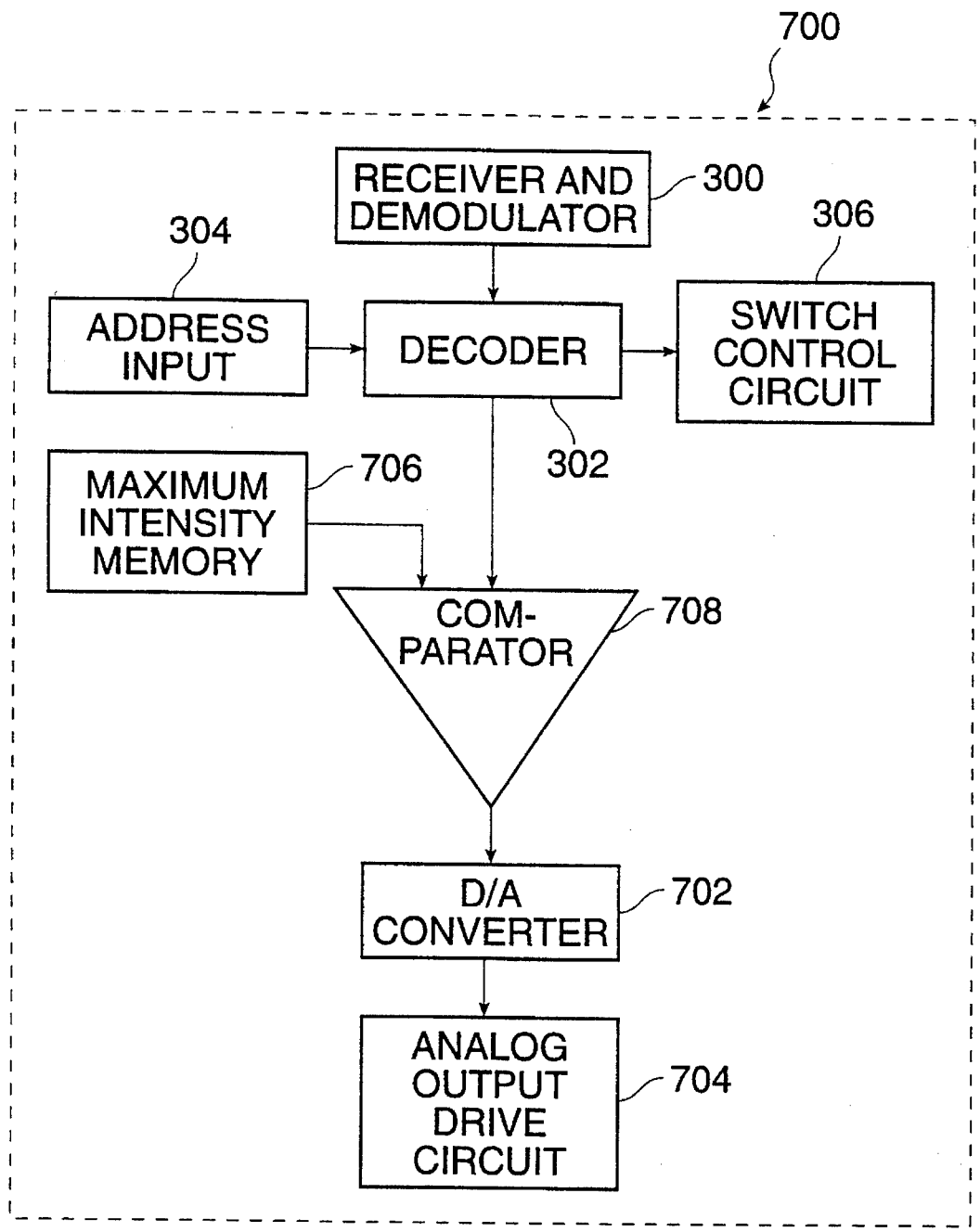
FIG. 7 is a block diagram of a second embodiment of the load control unit of the sensor system shown in FIG. 1.

FIGS. 6, 7, and 8 illustrate a second embodiment of the desktop sensor shown in FIG. 1. The sensor system of FIGS. 6–8 includes three components: a portable remote sensing device 600 (FIG. 6), a load control unit 700 (FIG. 7), and a maintenance unit 800 (FIG. 8). Sensing device 600 operates on battery power (or alternatively, AC power) to detect the presence of a person in room 120 and the level of ambient light entering room 120 through a window 122. Sensing device 600 processes the received information and communicates the processed information in the form of control signals to control unit 700 by a wireless transmission method.

Maintenance unit 800 is a hand-held unit that is used to transmit to control unit 700 a signal that sets a maximum brightness level at which a light controlled by control unit 700 can operate. Maintenance unit 800 allows a building administrator or other worker to set the maximum intensity level of lights connected to load control unit 700. Limiting the brightness level of lights in certain areas of a building, or throughout the entire building, to an intensity level below the maximum allows for savings in electricity and reduced energy costs.

FIG. 6 is a block diagram of one embodiment of remote sensing device 600. Remote sensing device 600 is similar in structure to sensing device 100, so for convenience, the same reference numerals used in FIG. 2 are used in FIG. 6 to refer to like elements of the sensing devices.

Remote sensing device 600 comprises a detector 200, an amplifier and filter circuit 202, a timer circuit 204, an address input unit 208, a transmitter 210, a photo sensor 602, an amplifier and filter circuit 604, an analog-to-digital converter 606, a control circuit 608, a light level input device 610, a light level counter 612, an encoder 614, and a power management circuit 616.

Sensing device 600 switches light 124 ON or OFF in response to detecting the presence or absence of a person and also adjusts the brightness of light 124 depending on the level of detected ambient light and a user's selected brightness level. Since sensing device 600 detects the presence of a person and is assigned an address in the same manner as remote sensing unit 100, only the light brightness adjusting features of remote sensing device 600 are described.

Photo sensor 602 senses the level of ambient light present at the location where sensing device 600 is situated and generates an analog ambient light level signal indicative of the sensed light level. Photo sensor 602 is coupled at an output to an input of amplifier and filter circuit 604, which amplifies and filters the ambient light level signal generated by photo sensor 602. Amplifier and filter circuit 604 is coupled at an output to an input of analog-to-digital converter 606. Analog-to-digital converter 606 converts the analog ambient light level signal to a digital signal that is used by control circuit 608 to set the brightness level of light 124. Alternatively, photo sensor 602 and associated circuitry can be mounted in a unit separate from remote sensing device 600. The separate unit could be within load control unit 700 or within its own housing in communication with load control unit through a wire or wireless means.

Control circuit 608 is coupled at a first input to timer circuit 204, at a second input to analog-to-digital converter 606, and at a third input to light level input 610. Control circuit 608 compares the level of ambient light detected by photo sensor 602 with the user's selected light brightness level from light level input 610 and calculates whether the intensity of light 124 needs to be increased and by how much. If the brightness of light 124 needs to be increased to maintain the user's selected brightness level, control circuit 608 outputs an intensity level signal indicative of the requisite intensity level of light 124. The intensity level signal is a 4-bit digital signal that allows light 124 to be set at one of sixteen different intensity levels. Of course, other embodiments can vary the bit size of the intensity level signal to allow for the selection of more or fewer intensity levels.

Because the retina of the human eye is slow to adjust to light changes, one embodiment of the present invention does not use control circuit 608 to decrease the intensity of light 124 even if the level of detected ambient light increases. Decreasing the intensity of light 124 in these instances may be more of an annoyance to a person in the room than an energy saver. Other embodiments, however, freely adjust the intensity of light 124 in response to increases or decreases of ambient light detected by photo sensor 602. Additionally, in one other embodiment, only changes above a specified de minimis level are effected by control circuit 608.

Light level input device 610 can be a key pad input device that allows a user to select a desired brightness level for light 124 by pressing a first key to increase the light intensity level or a second key to decrease the light intensity level. Of course, those skilled in the art will recognize that many other input devices besides key pads, e.g., a potentiometer, can be used to enable a user to select a desired brightness level. In one embodiment, each time the first key is depressed by a user, the intensity level of light 124 is increased by a fixed intensity level, while each time the second key is depressed, the intensity level is decreased by the fixed intensity level. Accordingly, pressing the first key down three times (or holding it down for a certain period of time) increases the brightness of light 124 by 3 intensity levels.

Light level input device 610 is coupled at an output to an input of light level counter 612. Light level counter 612 acts as a memory and tracks the desired brightness level selected by the user. Thus, each time the user presses the first key to increase the brightness of light 124, counter 612 is incremented by one. Each time the second key is depressed to decrease the brightness of light 124, counter 612 is decremented by one count. An output of light level counter 612 is coupled to encoder 614.

Encoder 614, coupled at an output to an input of transmitter 210, encodes the control signal, address signal, and intensity signal into a single digital signal for transmission by transmitter 210. Transmitter 210 transmits the digital signal directly, or uses it to modulate a carrier signal, so that it can be received by load control unit 700.

Power management circuit 616 is almost identical to power management circuit 212 except that it places timer circuit 204, control circuit 608, encoder 614, and photo sensor 602 in sleep mode when timer circuit 204 times-out. Additionally, because the light measured from photo sensor 602 does not need to be constantly sampled, when portable sensing device 600 is not in sleep mode, power management circuit 616 ensures that photo sensor 602 is activated for only a small percentage of time as compared to the rest of the circuitry on portable sensing device 600. For example, in one embodiment, power management circuit 616 activates photo sensor 602 for 5 seconds every 5 minutes.

FIG. 7 is a block diagram of one embodiment of load control unit 700. Load control unit 700 is similar in structure to load control unit 102, thus, for convenience, the same reference numerals used in FIG. 2 are used in FIG. 7 to refer to like elements of the control units.

Load control unit 700 comprises receiver and demodulator 300, decoder 302, address input unit 304, switch control circuit 306, a digital-to-analog converter 702, an analog output drive circuit 704, a maximum intensity level memory 706, and a comparator 708.

Load control unit 700 receives the address, control, and intensity level signals transmitted by transmitter 210 of sensing device 600 and turns light 124 on or off or adjusts its intensity accordingly. The manner in which light 124 is turned ON and OFF and the manner in which the address of a received signal is verified is the same as described with load control unit 102. Thus, only the operation of adjusting the brightness of light 124 is described here.

The intensity level signal is received by receiver and demodulator 300 along with the control and address signals. After being demodulated by receiver and demodulator 300, the intensity signal is converted into a 4-bit parallel signal by serial-to-parallel converter 502, which is part of decoder 302. The intensity level signal is then sent to a first input of comparator 708 which has a second input coupled to an output of maximum intensity memory 706. Maximum intensity memory 706 holds the 4-bit maximum intensity level at which light 124 operates and is set by maintenance unit 800. In another embodiment, the maximum intensity level at which light 124 operates may be set through a switch unit, such as DIP switches, coupled to maximum intensity memory 706. Comparator 708 compares the intensity level signal with the maximum set intensity level and outputs the lower of the two signals. Thus, comparator 708 ensures that light 124 is not set above the maximum level set by maintenance unit 800.

The output of comparator 708 is coupled to an input of digital-to-analog converter 702 which converts the signal output from comparator 708 to an analog signal used to set the brightness or intensity level of light 124.

In one embodiment of the present invention, light 124 is a fluorescent lamp that is plugged into a dimmable ballast such as the Mark 7 Fluorescent Lamp Ballast manufactured by Advance Transformer Company. The Mark 7 ballast accepts a DC input voltage of between 1 and 10 volts to adjust the brightness of a fluorescent lamp. When the DC input voltage is 1 volt, the lamp is at its dimmest output, and when the DC input voltage is 10 volts, the lamp is brightest. Other companies manufacture similar ballasts that operate on identical or similar principles as the Mark 7. It should be obvious to one skilled in the art that analog output drive circuit 704 can be employed to drive lights connected to these ballasts also. Additionally, the present invention can be used to adjust the intensity of a light by means other than outputting a DC voltage. A great variety of light dimmers are on the market, and the present invention can be adapted to work with any of them.

Analog output drive circuit 704 generates an output that is appropriate to adjust the brightness of light 124 depending on the ballast used with light 124. Thus, when the Mark 7 ballast is used, a DC voltage of between 1 and 10 volts is output from analog output drive circuit 704.

FIG. 8 is a block diagram of one embodiment of the maintenance unit portion of the desktop sensor system illustrated in FIGS. 6–8. Maintenance unit 800 comprises a light level input unit 802, a light level counter 804, an encoder 806, and a transmitter 808.

Light level input unit 802 is used to set the maximum intensity level at which light 124 can be operated. Light level input unit 802 can comprise a first and a second key and operate in the same manner as key pad input unit 410, or light level input unit 802 can comprise a potentiometer or other input device as would be apparent to one skilled in the art. Additionally, light level counter 804 works in a manner identical to light level counter 612 to track the selected maximum brightness level.

Encoder 806 encodes the selected maximum brightness level and an address signal generated by microcontroller control system 810 into a signal transmitted by transmitter 808. The transmitted maximum brightness level signal is individually matched with each of the 256 possible addresses and transmitted 256 times, once at each address to load control unit 700. The transmission time for all 256 addresses is less than a couple of seconds, and this method ensures that an individual load control unit will receive the maximum brightness level regardless of its assigned address. Persons skilled in the art will readily recognize that other methods of ensuring address compatibility between the maintenance unit and each load control unit are possible, for example, each load control unit can be designed to respond to two known addresses: a master address sent by the maintenance unit and selectable address set to match the load control unit to its mated portable sensing device.

The signal transmitted be transmitter 808 is received at load control unit 700 by receiver and demodulator 300.

Maintenance controller 800 also includes a microcontroller control system 810 that allows it to interface with a computer 812 which can be part of an energy management system that maximizes efficient energy use in offices. Microcontroller control system 810 can communicate with computer 812 through an RS-232 or similar interface. Computer 812 can be programmed with the address information of all load control units in a building. Thus, computer system 812 can be programmed to set different maximum intensity levels for each load control unit in a building depending on the load control unit's location. For instance, all the load control units on the south side of a building which receives less sunlight on the north side, can be programmed to a maximum intensity level three levels below the maximum intensity level of load control units on the north side.

Computer 812 can then download the address of each load control unit and the maximum intensity level it is programmed to microcontroller control system 810 which stores the information in a memory. An office worker can take hand-held maintenance unit 800 throughout a building and use it to transmit each downloaded address signal and maximum intensity level signal pair to every installed load control unit or selected load control units. Each individual load control unit sent a signal from maintenance unit 800 will then respond only to its correct address and set its maximum intensity level accordingly.

III. Occupancy Detector With Power Strip

FIGS. 9–14 illustrate a third embodiment of the desktop sensor according to the present invention. The sensor system of FIGS. 9–14 includes a portable desktop sensing device 900 and a powerstrip 902, which has outlets for six electrical connections. Sensing device 900 communicates with powerstrip 902 through a communication path 901 which is a two-pair telephone line in one embodiment. Powerstrip 902 connects to an external electrical outlet through a power cord 903 (only partially shown).

Similar to portable sensing device 900, sensing device 900 is portable and can be placed almost anywhere on a user's desk to maximize convenience and functionality. In one embodiment, sensing device 900 is approximately 5½ inches in height, 2 inches in width (3 inches at the base), and weighs less than eight ounces. These dimensions were chosen so that sensing device 900 fits comfortably within a user's hand. If desired, sensing device 900 can also be made smaller to maximize its portability and convenience.

Sensing device 900 includes a motion sensor (not shown) situated behind opaque window 904 that detects if an area is occupied. When motion is not detected for a predetermined period of time, sensing device 900 generates a timeout signal causing power strip 902 to switch OFF selected electrical apparatus plugged into the strip. When an individual apparatus is switched OFF because motion was not detected for a set time period, the apparatus is placed in a sleep mode and is switched back ON by power strip 902 when the motion detector in sensing device 900 next detects motion.

Four buttons 906–909 on the front of sensing device 900 allow a user to select whether electricity to corresponding electrical outlets 911–914 is switched OFF thus placing appliances connected to the outlets into sleep mode in response to the timeout signal. For example, if buttons 907 and 908 are depressed and buttons 906 and 909 are not only, appliances connected to outlets 912 and 913 are placed in sleep mode (switched OFF) when motion is not detected for a set time period. Buttons 906–909 are opaque and each one has a corresponding LED positioned behind it that indicates whether the button is set such that its corresponding outlet will be switched OFF upon the occurrence of the timeout signal. Button 910 is a master control button that controls all outlets 911–914 and overrides the setting of each outlet's corresponding individual control button 906–909. When pressed once, button 910 sets each outlet 911–914 to switch OFF in response to the timeout signal. When pressed again, each outlet 911–914 conducts electricity to connected appliances even if the timeout signal is generated.

Two outlets, 915 and 916, in powerstrip 902 are not controlled by sensing device 900. Thus, appliances connected to outlets 915 and 916 remain ON irrespective of the position of buttons 906–910 and whether or not the motion detector detects movement in an area. Another embodiment of powerstrip 902 includes DIP switches that enable a user to customize the apparatus by selecting which button 906–909 controls which outlet 911–914.

Figure 15A:
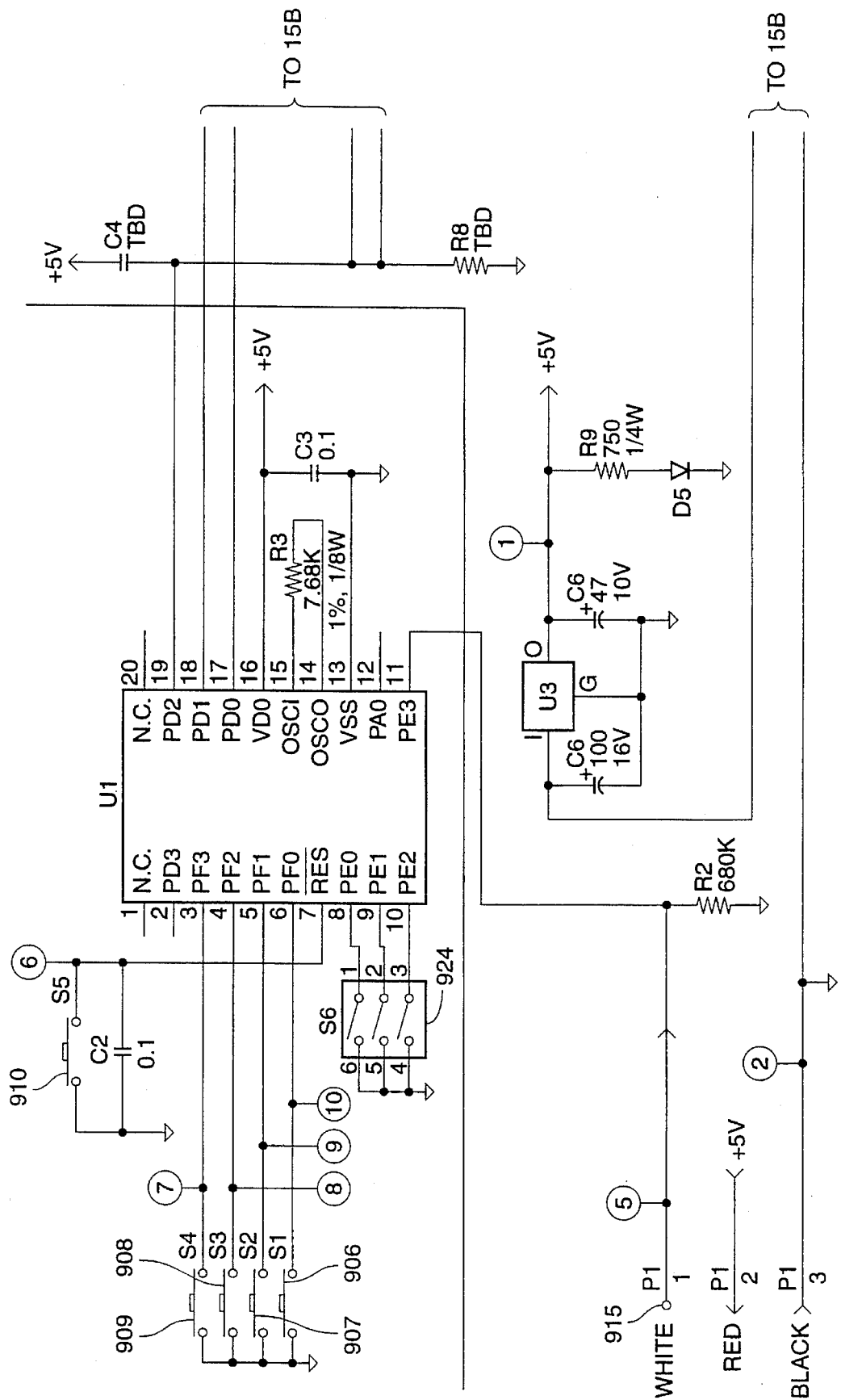
FIG. 15 is a circuit diagram of one embodiment of the portable desktop sensor shown in FIG. 9.
Figure 15B:
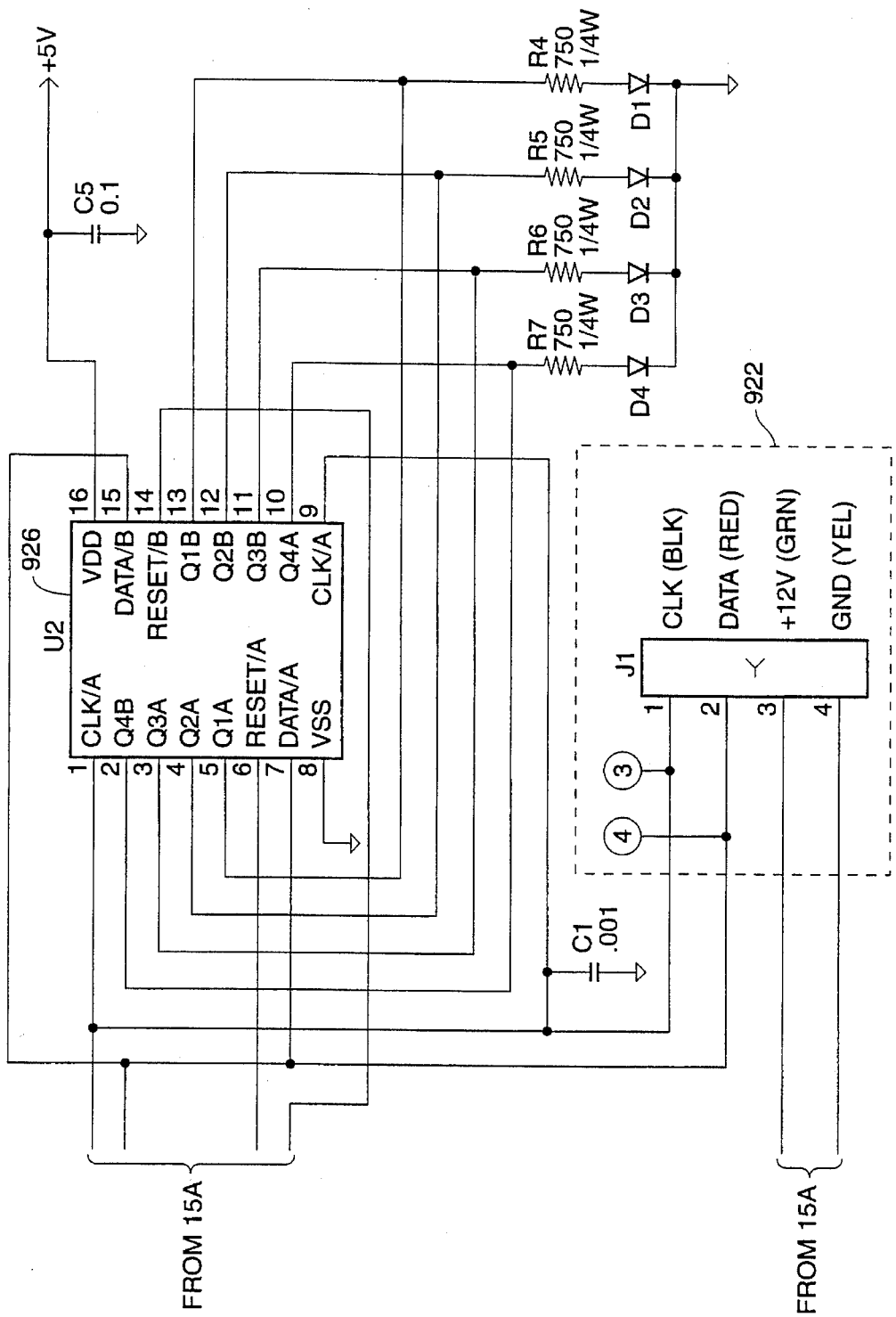

FIG. 15 is a circuit diagram of one embodiment of the portable desktop sensing device 900. The output of an infrared motion detector, not shown, is connected to the circuit at node 915 and input to a microprocessor 920 that includes timing functionality. Also input to microprocessor 920 are the output of switches 906–910 along with the output of DIP switches 924. DIP switches 924 allow a user to select one of nine different length predetermined time periods for the timeout signal to be generated within.

Figure 16A:
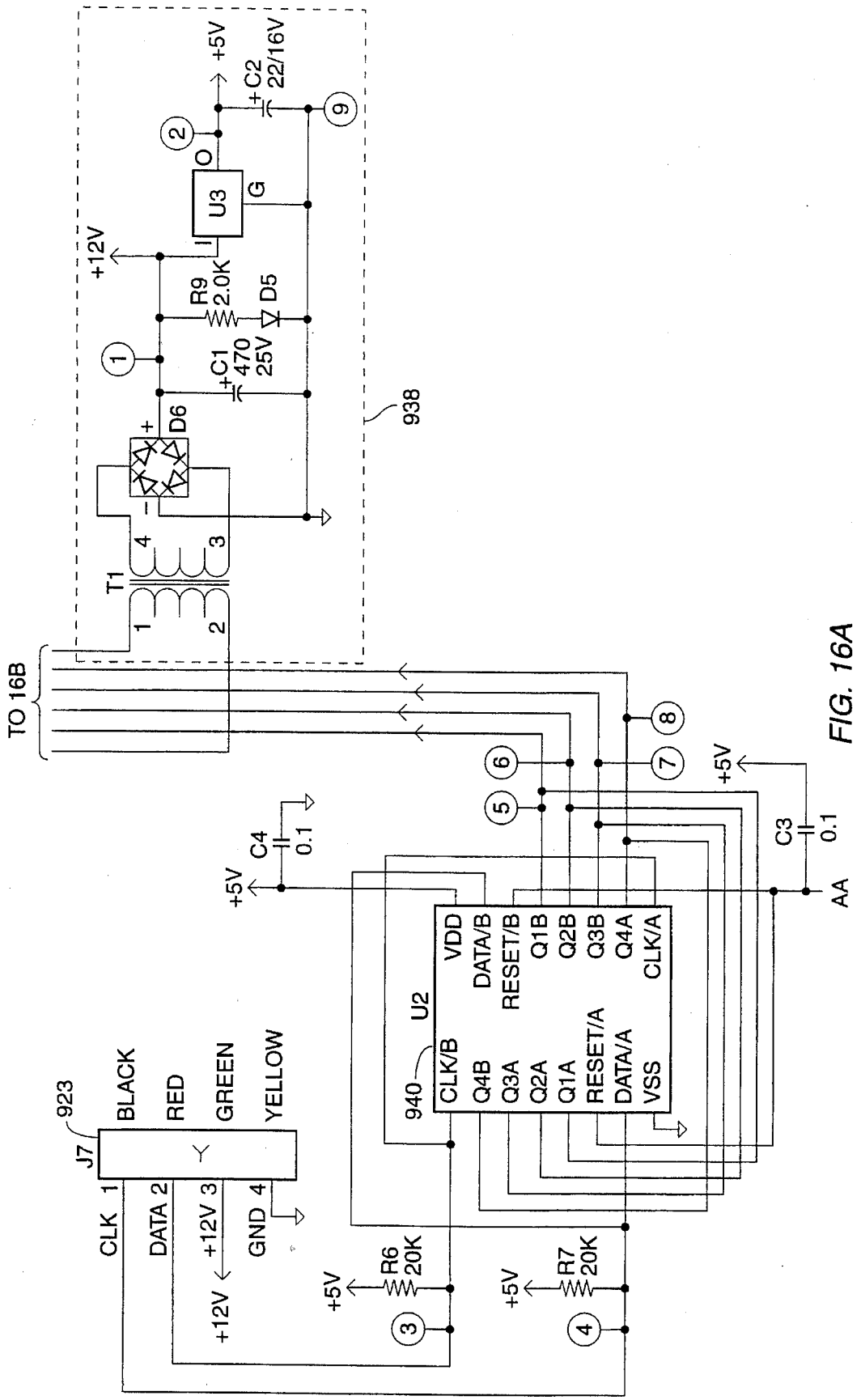
FIG. 16 is a schematic diagram of one embodiment of the powerstrip shown in FIG. 9.
Figure 16B:
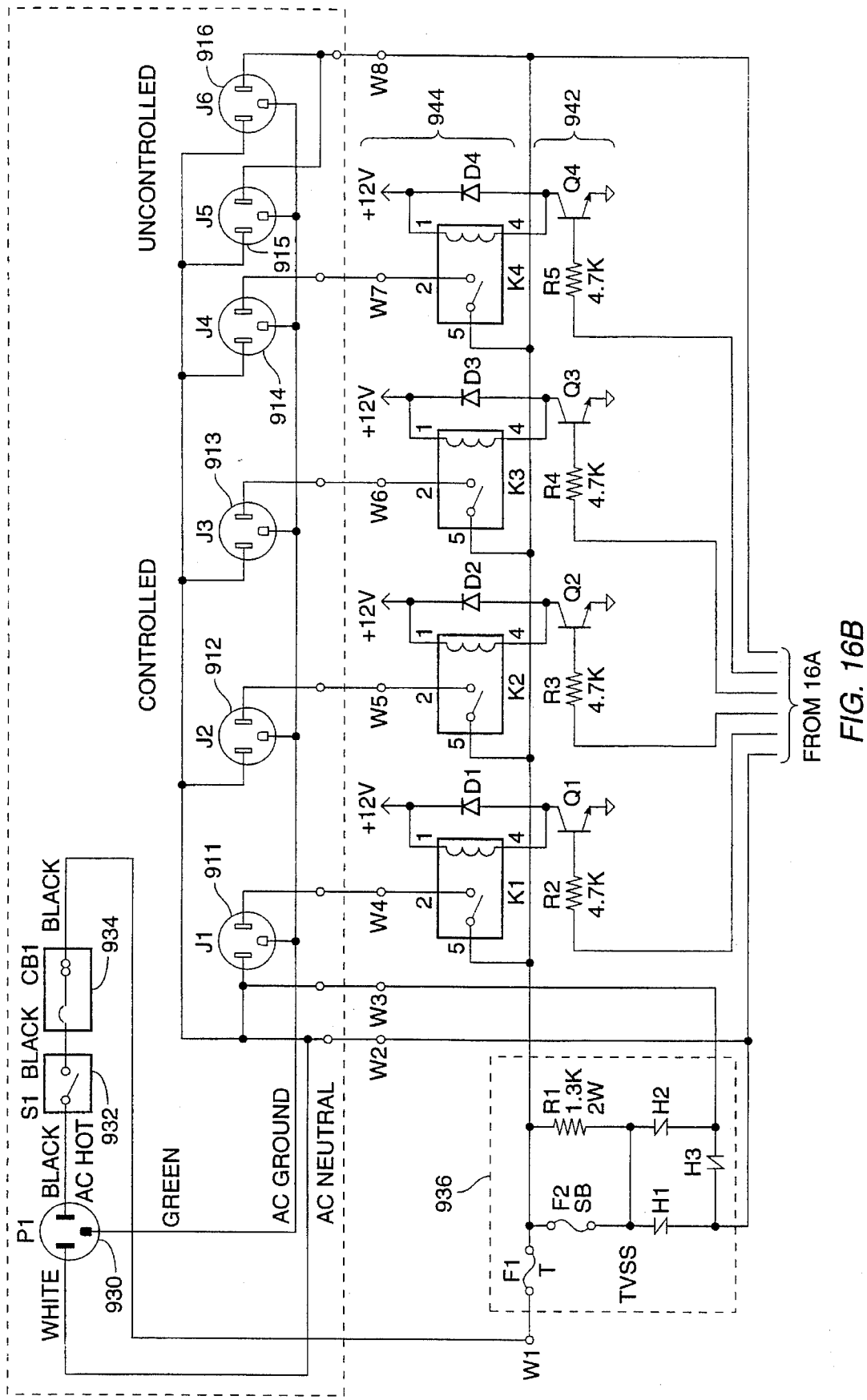

In response to inputs from the motion detector, switches 906–910 and DIP switches 924, Microprocessor 920 produces an analog data signal that controls which individual outlets 911–914 in powerstrip 902 are switched ON and OFF. The analog data signal is formatted in a manner known to those skilled in the art and sent along with a clock signal over two-pair wire 901. Microprocessor 920 periodically samples the output of the motion detector. If motion is not detected by the motion sensor during the time period selected by DIP switches 924, microprocessor 920 generates a data signal that switches power to individual outlets in powerstrip 902 OFF as described above. FIGS. 15 and 16 show that sensing device 900 and powerstrip 902 are connected to each other through standard RJ-11 phone-jack connectors 922 (FIG. 15) and 923 (FIG. 16).

An LED display buffer/driver 926 is coupled to microprocessor 920 and controls which LEDs positioned behind buttons 906–909 are lit to indicate the corresponding outlets for which power is switched ON and OFF in response to the motion detector.

Figure 9:
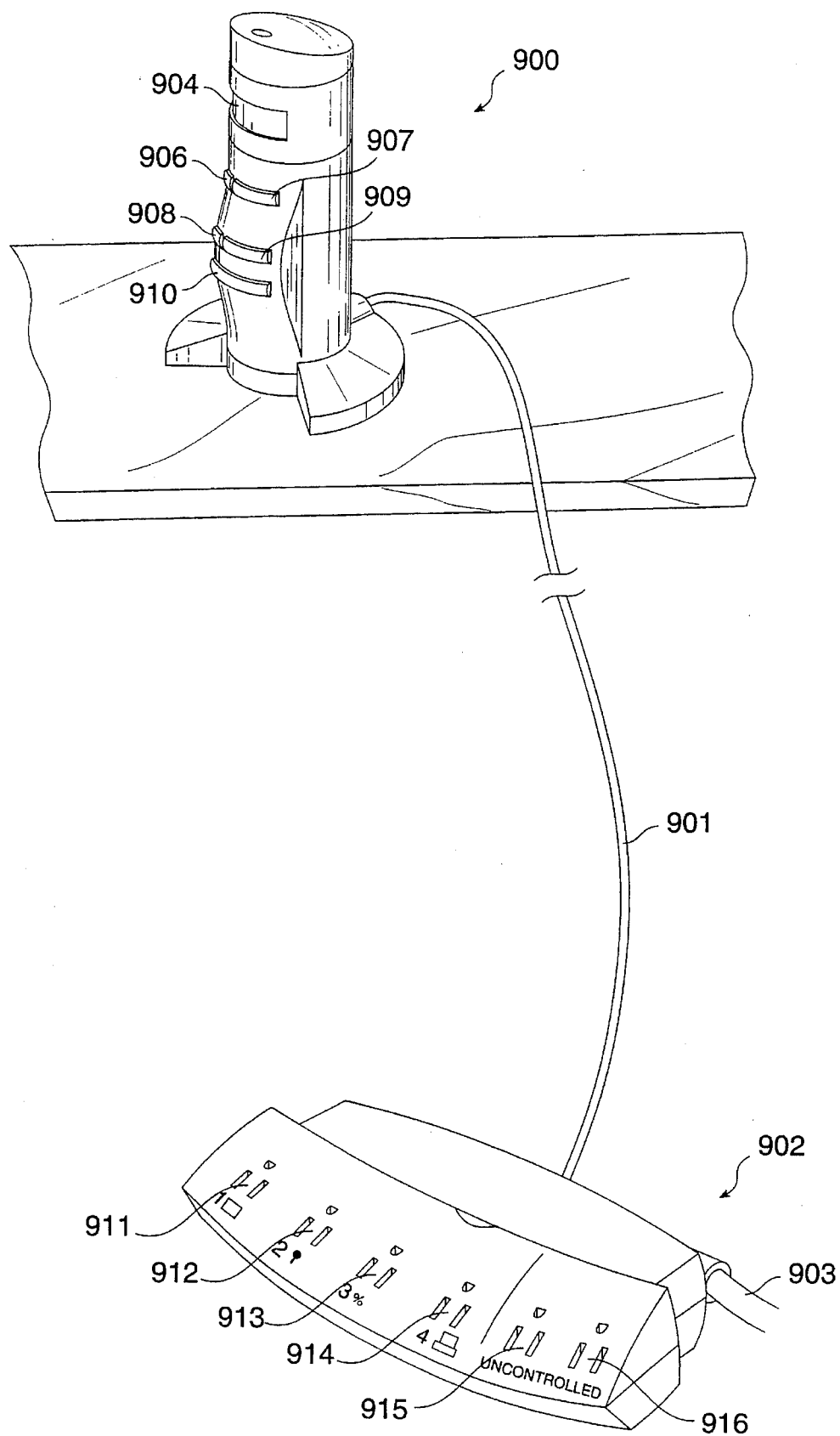
FIG. 9 is a perspective view of a portable desktop sensor connected to a power strip according to another embodiment of the present invention.
Figure 10:
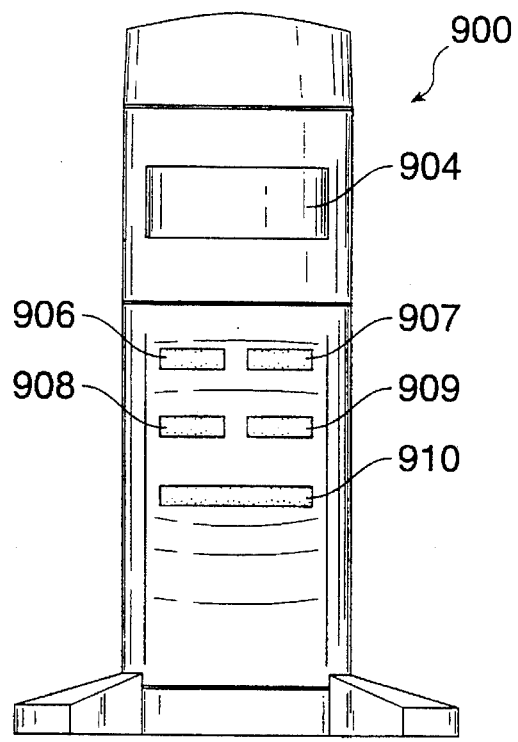
FIGS. 10–14 are front, rear, side, top and bottom plan views of one embodiment of the portable desktop sensor shown in FIG. 9.
Figure 11:
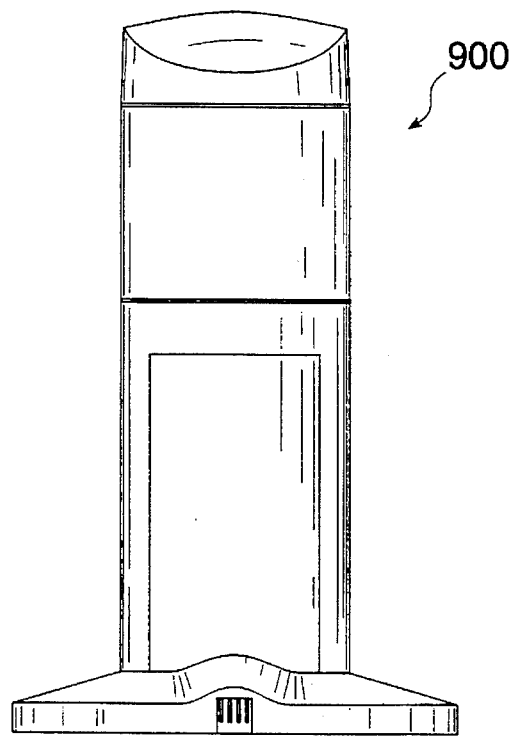
Figure 12:
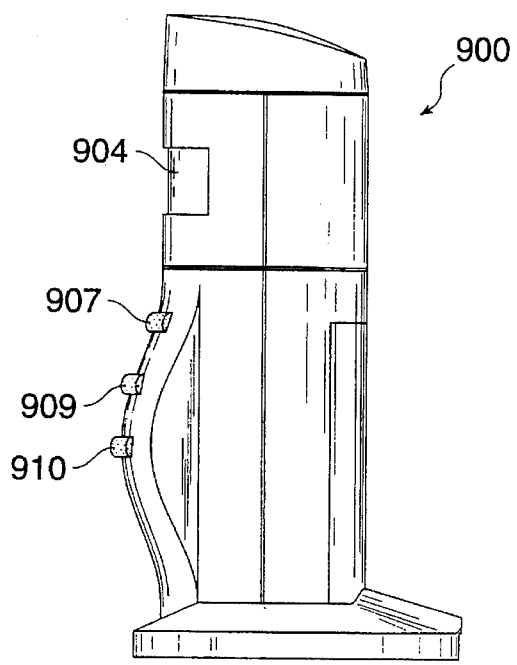
Figure 13:
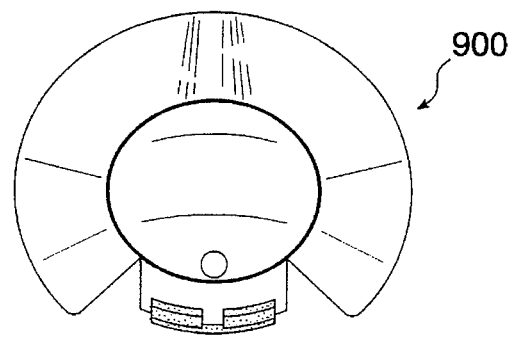
Figure 14:
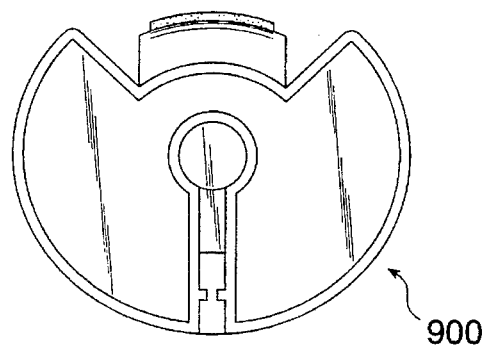

FIG. 16 is a schematic diagram of one embodiment of powerstrip 902 shown in FIG. 9. Powerstrip 902 connects to an external AC outlet through three-prong connector 930. A single switch 932 allows a user to switch each of outlets 911–916 OFF and a circuit breaker 934 cuts power to the outlets OFF in response to excessive heat produced from conditions such as above-normal current levels. A transient voltage surge protection circuit 936 protects appliances connected to outlets 911–916 from potentially damaging current spikes and noise as well-known to those of ordinary skill in the art.

Powerstrip 902 includes a DC power supply 938 that converts the AC power signal to +5 and +12 volt DC signals. The +12 volt DC signal is transmitted to sensing device 900 through two-pair wire 901.

The data and clock signals generated by microprocessor 922 are received at powerstrip 902 by a serial-to-parallel converter 940. Serial-to-parallel converter 940 converts the data signal into a 4-bit parallel signal that is sent to the base of transistors 942 (Q1–Q4). Each transistor Q1–Q4 controls a corresponding relay 944 (K1–K4) such that relays K1–K4 are closed when the data signal from microprocessor 922 indicates that corresponding outlets 911–914 are switched ON.

Having fully described three embodiments of the present invention, many other equivalent or alternative methods of implementing the desktop sensor will be apparent to those skilled in the art. For example, the load operated by the desktop sensor can be switched OFF by an asserted signal and on by a deasserted signal; the load can be switched ON or OFF upon receipt of a valid address signal as long as the load control unit remembers or can ascertain whether the load was previously ON or OFF. Additionally, sensing device 900 can include an infrared transmitter that sends a signal to a wall-mounted control unit to switch lights ON and OFF in response to the motion sensor as described in respect to the first two embodiments. Sensing device 900 can also include brightness selection interface, e.g., brightness control buttons, such that a user can control the brightness of lighting in the room. The brightness selection signal can be transmitted through electrical wiring connected to powerstrip 902 to a control unit connected to the lighting or can be transmitted by a wireless signal. The portable sensing device 900 can simply include user-interface controls to control the operation of powerstrip 902 while the motion detector is affixed to a wall or other location in a room that communicates to the device 900 by wireless communication or other means. Microprocessor 920 and other circuitry within sensing device 900 can instead be moved to powerstrip 920 providing an appropriate number of communications paths are present between sensing device 900 and powerstrip 902 so the state of each button 906–910 can be communicated to the microprocessor. Also, electronic circuitry that performs functionality equivalent to microprocessor 920 can be used in place of the microprocessor. These equivalents and alternatives are intended to be included within the scope of the present invention.

What is claimed is:

1. A system for controlling power to first and second electric outlets, said system comprising:

(a) a portable unit enclosed in a first casing, said portable unit comprising:
      1) a motion detector for detecting whether an area in which the portable apparatus is positioned is occupied;
      2) a first switch, corresponding to said first electric outlet, for allowing a user to select a first state where power to said first electric outlet is switched ON and OFF in response to said motion detector and a second state where power to said first electric outlet is not switched ON and OFF in response to said motion detector;
      3) a second switch, corresponding to said second electric outlet, for allowing a user to select a first state where power to said second electric outlet is switched ON and OFF in response to said motion detector and a second state where power to said second electric outlet is not switched ON and OFF in response to said motion detector;
      4) a processor, coupled to said motion detector and said first and second switches, for timing periods in which motion is not detected by said motion detector and for generating an analog dam signal to control whether power to said first and second switches is switched ON or OFF;

(b) a powerstrip, enclosed in a second casing separate from said first casing and coupled to said portable unit, for housing said first and second electric outlets, said powerstrip comprising:
      1) means for receiving AC power from an external source;
      2) an analog-to-digital converter for receiving and converting said analog data signal into first and second power control signals;
      3) a first power switch, coupled to said analog-to-digital converter, for switching power to said first electric outlet ON and OFF in response to said first power control signal; and
      4) a second power switch, coupled to said analog-to-digital converter, for switching power to said second electric outlet ON and OFF in response to said second power control signal.

2. The system set forth in claim 1 wherein said data signal indicates power to said first electric outlet is switched OFF when said motion detector does not detect motion for a predetermined time and said first switch is set to said first state and indicates power to said second electric outlet is switched OFF when said motion detector does not detect motion for a predetermined time and said second switch is set to said first state.

3. The system set forth in claim 1 wherein said first and second power switches each comprise a control transistor, coupled at a base to said analog-to-digital converter, and a relay, coupled to an emitter of said control transistor.

4. The system set forth in claim 1 wherein said powerstrip further comprises a third electric outlet which cannot be switched ON and OFF by said processor.

5. The system set forth in claim 1 wherein said first and second switches in said portable unit each comprise a push button switch coupled to an LED which indicates the position of the switch.

6. The system set forth in claim 1 wherein said portable unit further comprises a master control switch, coupled to said processor, for overriding said first and second switches and allowing a user to select a first state where power to said first and second electric outlets is switched ON and OFF in response to said motion detector and a second state where power to said first and second electric outlets is not switched ON and OFF in response to said motion detector.

7. A system for controlling power to at least one electric outlet, said system comprising:
(a) a portable remote desktop unit comprising:
1) a motion detector for detecting whether an area in which the portable apparatus is positioned is occupied;
2) a switch, corresponding to said at least one electric outlet, for allowing a user to select whether power to said one electrical outlet is switched ON and OFF in response to said motion detector;
3) a processor, coupled to said motion detector and said switch, for timing periods in which no motion is detected by the motion detector and for generating a control signal when said area is unoccupied for a predetermined period of time and said switch is set so that said one electrical outlet is switched ON and OFF in response to said motion detector;
(b) a powerstrip for housing said at least one electrical outlet, said powerstrip comprising a switch, responsive to said control signal, to switch said one electrical outlet OFF in response to said control signal.

8. A portable apparatus for controlling power to a lighting unit and for controlling power to at least one electrical outlet housed in an external housing, said apparatus comprising:
(a) detecting means for detecting whether an area in which the portable apparatus is positioned is occupied;
(b) signal generating means, coupled to said detecting means, for generating a control signal indicating whether said area is occupied;
(c) a brightness selection system which allows a user to select a particular brightness level of the lighting unit and generates an intensity signal indicating said desired brightness level;
(d) wireless transmitting means, coupled to said signal generating means, for transmitting a wireless transmission of said control signal and said intensity signal from said detecting means; and
(e) second transmitting means, coupled to said signal generating means, for transmitting said control signal to said electrical outlet.

9. The apparatus of claim 8 wherein said brightness selection system comprises at least a first and a second key, said first key for enabling said user to select incrementally increasing brightness levels of said light and said second key for allowing said user to select incrementally decreasing brightness levels of said light.

10. A system for controlling power to a lighting unit including the portable apparatus set forth in claim 8 and further comprising a light control unit, coupled to said lighting unit, said light control unit including:
(a) signal receiving means for receiving said wireless transmission of said control signal and said intensity signal;
(b) brightness adjusting means, coupled to said signal receiving means and responsive to said wireless transmission of said intensity signal, for adjusting the brightness level of said light in response to said intensity signal; and
(c) power switching means, coupled to said signal receiving means and responsive to said wireless transmission of said control signal, for switching power to said lighting unit.

11. A portable apparatus for controlling power to a lighting unit and for controlling power to at least one electrical outlet housed in an external housing, said apparatus comprising:
(a) a motion detector for detecting whether an area in which the portable apparatus is positioned is occupied;
(b) a timing circuit for timing periods in which no motion is detected by the motion detector and generating a timeout signal when said area is unoccupied for a predetermined period of time;
(c) outlet control means for allowing a user to select whether said at least one electrical outlet is switched ON and OFF in response to said timeout signal;
(d) signal generating means, coupled to said timing circuit, for generating a lighting unit control signal in response to said timeout signal and for generating an electrical outlet control signal in response to said timeout signal and said outlet control means;
(e) wireless transmitting means, coupled to said signal generating means, for transmitting a wireless transmission of said lighting unit control signal from said detecting means; and
(f) second transmitting means, coupled to said signal generating means, for transmitting said electrical outlet control signal to said electrical outlet.

12. The apparatus of claim 11 wherein a microprocessor comprises said timing circuit and said signal generating means.

13. A system for controlling power to a lighting unit including the portable apparatus set forth in claim 11 and further comprising a light control unit, coupled to said lighting unit, said light control unit including:
(a) signal receiving means for receiving said wireless transmission of said control signal and said intensity signal; and
(b) power switching means, coupled to said signal receiving means and responsive to said wireless transmission of said control signal, for switching power to said lighting unit.

\* \* \* \* \*